(12) United States Patent
Naini et al.

(10) Patent No.: US 11,816,995 B2
(45) Date of Patent: Nov. 14, 2023

(54) METHODS AND APPARATUSES FOR UPDATING UAV STATUS IN UAS ECOSYSTEM

(71) Applicant: QUALCOMM Incorporated, San Diego, CA (US)

(72) Inventors: Santosh Reddy Naini, Hyderabad (IN); Sarath Chandra Vaidyula, Hyderabad (IN); Naveen Kumar Pasunooru, Hyderabad (IN); Prashanth Mohan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 16/896,671

(22) Filed: Jun. 9, 2020

(65) Prior Publication Data

US 2020/0394926 A1    Dec. 17, 2020

(30) Foreign Application Priority Data

Jun. 14, 2019   (IN) .............................. 201941023645

(51) Int. Cl.
*G08G 5/00*     (2006.01)
*H04W 4/44*     (2018.01)
(Continued)

(52) U.S. Cl.
CPC ......... *G08G 5/0013* (2013.01); *B64C 39/024* (2013.01); *G05D 1/0022* (2013.01);
(Continued)

(58) Field of Classification Search
CPC .. G08G 5/0013; G08G 5/0043; G08G 5/0069;
G08G 5/0082; B64C 39/024; B64C 2201/027; G05D 1/0022; H04W 4/44; H04W 76/19; H04W 4/10; H04W 4/70; H04W 4/80; H04W 4/00; H04B 7/18504
See application file for complete search history.

(56) References Cited

U.S. PATENT DOCUMENTS 5,920,321 A  *  7/1999  Owen .................... G01C 23/00
                                                    345/428
8,862,287 B1 *  10/2014 Clark .................... G01C 23/00
                                                    705/2
(Continued)

FOREIGN PATENT DOCUMENTS

CA         3072709 A1     2/2019
WO      2018204641 A1    11/2018

OTHER PUBLICATIONS

International Search Report and Written Opinion—PCT/US2020/037045—ISA/EPO—dated Oct. 16, 2020.

*Primary Examiner* — Yonel Beaulieu
(74) *Attorney, Agent, or Firm* — Changwoo Yang

(57) ABSTRACT

Method and apparatus are provided for updating unmanned aerial vehicle (UAV) status in unmanned aircraft system (UAS) ecosystem. In accordance with some implementation, a UE may determine a change in flight state of an unmanned aerial vehicle (UAV). The UE upon such determination may communicating to an unmanned aerial system traffic management (UTM) the fight state via a wireless wide area network (WWAN). This may allow the UTM to more efficiently manage and allocate resources to UAVs.

12 Claims, 8 Drawing Sheets

(51) Int. Cl.
*G05D 1/00* (2006.01)
*B64C 39/02* (2023.01)
*H04W 76/19* (2018.01)
*B64U 10/13* (2023.01)

(52) U.S. Cl.
CPC ............ *G08G 5/0043* (2013.01); *H04W 4/44* (2018.02); *H04W 76/19* (2018.02); *B64U 10/13* (2023.01)

(56) References Cited

U.S. PATENT DOCUMENTS

| | | | |
|---|---|---|---|
| 2008/0215192 A1* | 9/2008 | Hardman | G01C 23/00 701/3 |
| 2011/0140950 A1* | 6/2011 | Andersson | G01S 5/0072 342/41 |
| 2013/0248648 A1* | 9/2013 | Lesperance | G05D 1/0016 244/17.13 |
| 2014/0297067 A1* | 10/2014 | Malay | G08C 17/02 701/4 |
| 2017/0069213 A1* | 3/2017 | Thomas | G08G 5/0013 |
| 2017/0242431 A1 | 8/2017 | Dowlatkhah et al. | |
| 2018/0336789 A1 | 11/2018 | Damnjanovic et al. | |
| 2019/0115974 A1* | 4/2019 | Frolov | H01Q 1/125 |
| 2019/0164434 A1* | 5/2019 | Cantaloube | G08G 5/0026 |
| 2020/0023992 A1* | 1/2020 | Conaway | B64D 45/00 |
| 2020/0043347 A1* | 2/2020 | Wartofsky | H04B 7/18506 |
| 2020/0235607 A1* | 7/2020 | Kanarellis | G06F 1/30 |
| 2020/0251002 A1* | 8/2020 | Balasubramanian | G08G 5/0021 |
| 2020/0394928 A1* | 12/2020 | Neubauer | H04W 4/40 |
| 2021/0067239 A1* | 3/2021 | Babich | H04W 16/18 |

* cited by examiner

METHODS AND APPARATUSES FOR UPDATING UAV STATUS IN UAS ECOSYSTEM

CLAIM OF PRIORITY

The present application for patent claims priority to Indian Provisional Patent Application No. 201941023645, entitled "METHODS AND APPARATUSES FOR UPDATING UAV STATUS IN UAS ECOSYSTEM," filed Jun. 14, 2019, assigned to the assignee hereof.

TECHNICAL FIELD

The present disclosure relates generally to wireless communication systems, and more particularly, to methods and apparatus for updating unmanned aerial vehicle (UAV) status in unmanned aircraft system (UAS) ecosystem.

INTRODUCTION

User equipments (UEs), such as phones, tablet computers, desktop computers or laptop computers, are generally configured to connect to terrestrial wireless communication subscriber networks (e.g., 3G, 4G, 5G LTE, 5G New Radio (NR), etc.) with the expectation that the UEs are not airborne. For example, users are typically asked to place their respective UEs into "airplane" mode between takeoff and landing for commercial flights, which restricts the UEs' capability for connecting to terrestrial wireless communication subscriber networks.

For most manned (or piloted) aerial vehicles, typical cruising altitudes and/or speeds make connections to terrestrial wireless communication subscriber networks impractical. For example, commercial aircraft may reach cruising altitudes near 12 km at speeds between 800-1000 km/hr. Instead of relying upon terrestrial wireless communication subscriber networks to support communications for/with manned aerial vehicles such as commercial aircraft, most countries allocate a portion of Very High Frequency (VHF) radio spectrum to define an Airband or Aircraft band that is dedicated to radio-navigational communications and/or air traffic control communications.

Regulatory agencies are increasingly authorizing deployment of unmanned aerial vehicles (UAVs), such as commercial drones. Commercial drones are being considered to provide a variety of services, such as package delivery, search-and-rescue, monitoring of critical infrastructure, wildlife conservation, flying cameras, surveillance, and so on. Commercial drones may operate at altitudes and speeds that are more suitable for connections to terrestrial wireless communication subscriber networks. For example, in certain environments, commercial drones may operate at cruising altitudes near 100 m at speeds up to or near 160 km/h. A management ecosystem managing multiple UAVs may benefit from information on the status of UAVs, in particular whether an UAV is in flight or not.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment (UE). The method generally includes determining a change in flight state of an unmanned aerial vehicle (UAV) and communicating to an unmanned aerial system traffic management (UTM) the fight state via a wireless wide area network (WWAN). In an aspect, the flight state may comprise a mobile mode, a stationary mode, a flight mode, or combination thereof. In an aspect, the UE may additionally communicate to the UTM a capability information of the UAV, wherein the capability information comprises the flight state. In an aspect, the communicating the flight state to an UTM may comprise initiating a radio link failure (RLF) procedure and communicating to the UTM a capability information, wherein the capability information is based on the determined change in the flight state. In another aspect, communicating the flight state to an UTM may comprise communicating to a presence server the determined change in the flight state.

Certain aspects of the present disclosure provide a method for wireless communications by an unmanned aerial system traffic management (UTM). The method generally includes receiving an information indicative of a change in a flight state of an unmanned aerial vehicle (UAV) and managing operation of one or more UAVs based on the information, wherein managing comprises at least one of allocating flight path, allocating resource, and managing traffic.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
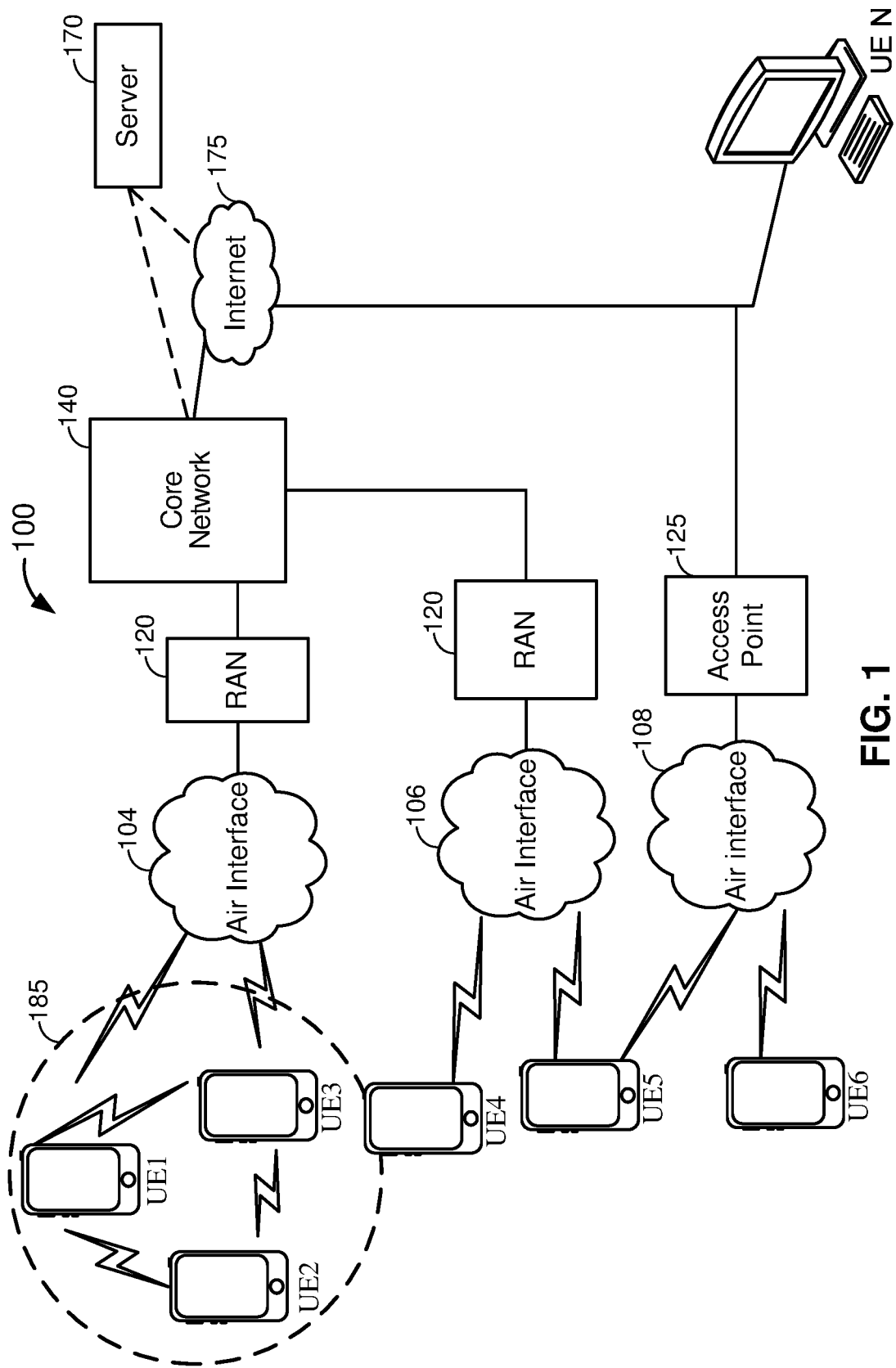
FIG. 1 illustrates a high-level system architecture of a wireless communications system in accordance with an embodiment of the disclosure.

An unmanned aerial vehicles (UAV) may be connected to a terrestrial wireless communication networks and be part of an unmanned aircraft system (UAS) ecosystem. An UAS ecosystem may include one or more UAVs and one or more UAV controllers and may support identification of UAVs, mobility procedures, and reliability.

Within the UAS ecosystem, unmanned aircraft system traffic management (UTM) may be responsible for authentication, authorization and traffic management of UAVs. Pertinent information of the UAV may allow an UTM to efficiently track, allocate flight paths, and manage traffic of UAVs.

An UAS ecosystem may provide information whether an UAV is present at the source or destination of the allocated flight path to an UTM. However, an UAS ecosystem may not be equipped with providing UAV state information other than whether the UAV is at the source or destination. It may be desirable to provide additional state information of the UAV to an UTM to improve the efficiency of the UAS ecosystem. In particular, providing flight and/or standby state of an UAV to an UTM may allow the UTM to judiciously assign flight paths of the UAV and other UAVs, perform enhanced power management by communicating to the UAV to shut down non-essential functions or unused sensors, and reduce latency of the UTM by more efficiently managing UAV's operation.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates a high-level system architecture of a wireless communications system 100 in accordance with an embodiment of the disclosure. The wireless communications system 100 contains UEs 1 . . . N. For example, in FIG. 1, UEs 1 . . . 3 are illustrated as cellular calling phones, UEs 1 . . . 6 are illustrated as cellular touchscreen phones or smart phones, and UE N is illustrated as a desktop computer or PC.

Referring to FIG. 1, UEs 1 . . . N are configured to communicate with an access network (e.g., a RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, 4G LTE, 5G LTE, 5G New Radio (NR), etc.), while the air interface 108 can comply with a wireless IP protocol (e.g., IEEE 802.11). The RAN 120 may include a plurality of access points that serve UEs over air interfaces, such as the air interfaces 104 and 106. The access points in the RAN 120 can be referred to as access nodes or ANs, access points or APs, base stations or BSs, Node Bs, eNBs, gNBs, and so on. These access points can be terrestrial access points (or ground stations), or satellite access points. The RAN 120 may be configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. As used herein, the RAN 120, the core network 140 or a combination thereof may be referred to as a terrestrial wireless communication subscriber network.

The Internet 175, in some examples includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UEs 1 . . . N via the core network 140. Also shown in FIG. 1 is the access point 125 that is separate from the RAN 120. The access point 125 may be connected to the Internet 175 independent of the core network 140 (e.g., via an optical communications system such as FiOS, a cable modem, etc.). The air interface 108 may serve UE 5 or UE 6 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. The server 170 may correspond to any type of server, such as a web server (e.g., hosting a web page), an application download server, or an application server that supports particular communicative service(s) such as IP Multimedia Subsystem (IMS) service, such as Voice-over-Internet Protocol (VoIP) sessions, Push-to-Talk (PTT) sessions, group communication sessions, social networking services, etc.

Referring to FIG. 1, UEs 1 . . . 3 are depicted as part of a D2D network or D2D group 185, with UEs 1 and 3 being connected to the RAN 120 via the air interface 104. In an embodiment, UE 2 may also gain indirect access to the RAN 120 via mediation by UEs 1 and/or 3, whereby data 'hops' to/from UE 2 and one (or more) of UEs 1 and 3, which communicate with the RAN 120 on behalf of UE 2.

Figure 2A:
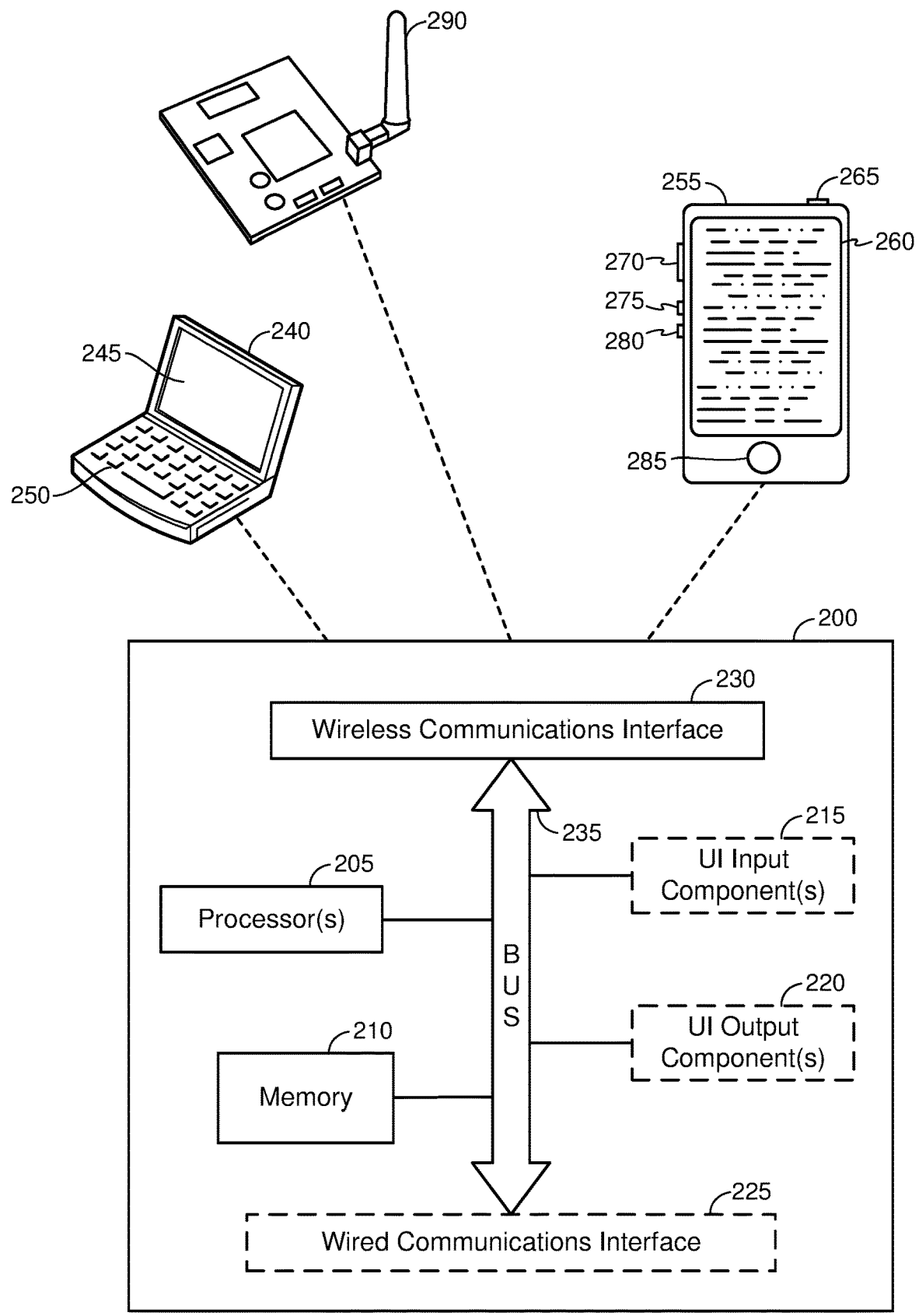
FIG. 2A illustrates a user equipment (UE) in accordance with an embodiment of the disclosure.

FIG. 2A illustrates a UE 200 in accordance with an embodiment of the disclosure. The UE 200 includes one or more processors 205 (e.g., one or more ASICs, one or more digital signal processors (DSPs), etc.) and a memory 210 (e.g., RAM, ROM, EEPROM, flash cards, or any memory common to computer platforms). The UE 200 also optionally includes one or more UI input components 215 (e.g., a keyboard and mouse, a touchscreen, a microphone, one or more buttons such as volume or power buttons, etc.) and one or more UI output components 220 (e.g., speakers, a display screen, a vibration device for vibrating the UE 200, etc.). In an example, the UI input components 215 and UI output components 220 are optional because the UE 200 need not interface with a local user in all implementations. For example, if the UE 200 is implemented as a wireless communications component of a commercial drone, the UE 200 may be interfaced with via remote connections instead of a local UI interface.

The UE 200 further includes a wired communications interface 225 and a wireless communications interface 230. In an example, the wired communications interface 225 may be optional (e.g., commercial drones may be configured for wireless communication only). In an example embodiment, if made part of the UE 200, the wired communications interface 225 can be used to support wired local connections to peripheral devices (e.g., a USB connection, a mini USB or lightning connection, a headphone jack, graphics ports such as serial, VGA, HDMI, DVI or DisplayPort, audio ports, and so on) and/or to a wired access network (e.g., via an Ethernet cable or another type of cable that can function as a bridge to the wired access network such as HDMI v1.4 or higher, etc.). In another example embodiment, the wireless communications interface 230 includes one or more wireless transceivers for communication in accordance with a local wireless communications protocol (e.g., WLAN or WiFi, WiFi Direct, Bluetooth, etc.) and/or one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, LTE, 4G, 5G LTE, 5G NR or other protocols that may be used in a terrestrial wireless communication subscriber network). The various components 205-230 of the UE 200 can communicate with each other via a bus 235.

Referring to FIG. 2A, the UE 200 may correspond to any type of UE, including but not limited to a smart phone, a laptop computer, a desktop computer, a tablet computer, a wearable device (e.g., a pedometer, a smart watch, etc.), a communications component of a larger device (e.g., a cellular module integrated into a commercial drone), and so on. Three particular implementation examples of the UE 200 are depicted in FIG. 2A, which are illustrated as laptop 240, touchscreen device 255 (e.g., a smart phone, a tablet computer, etc.) and terrestrial wireless communication subscriber network (e.g., cellular) module 290. The laptop 240 includes a display screen 245 and a UI area 250 (e.g., keyboard, touchpad, power button, etc.), and while not shown the laptop 240 may include various ports as well as wired and/or wireless transceivers (e.g., Ethernet card, WiFi card, broadband card, etc.).

The touchscreen device 255 is configured with a touchscreen display 260, peripheral buttons 265, 270, 275 and 280 (e.g., a power control button, a volume or vibrate control button, an airplane mode toggle button, etc.), and at least one front-panel button 285 (e.g., a Home button, etc.), among other components, as is known in the art. While not shown explicitly as part of the touchscreen device 255, the touchscreen device 255 can include one or more external antennas and/or one or more integrated antennas that are built into the external casing of the touchscreen device 255, including but not limited to WiFi antennas, cellular antennas, satellite position system (SPS) antennas (e.g., global positioning system (GPS) antennas), and so on.

The terrestrial wireless communication subscriber network (e.g., cellular) module 290 is illustrated in FIG. 2A as a circuit coupled to a radio antenna. The terrestrial wireless communication subscriber network (e.g., cellular) module 290 may be integrated into a larger structure, such as a commercial drone, with the terrestrial wireless communication subscriber network (e.g., cellular) module 290 representing the UE (or communicative) component of the larger structure.

Figure 2B:
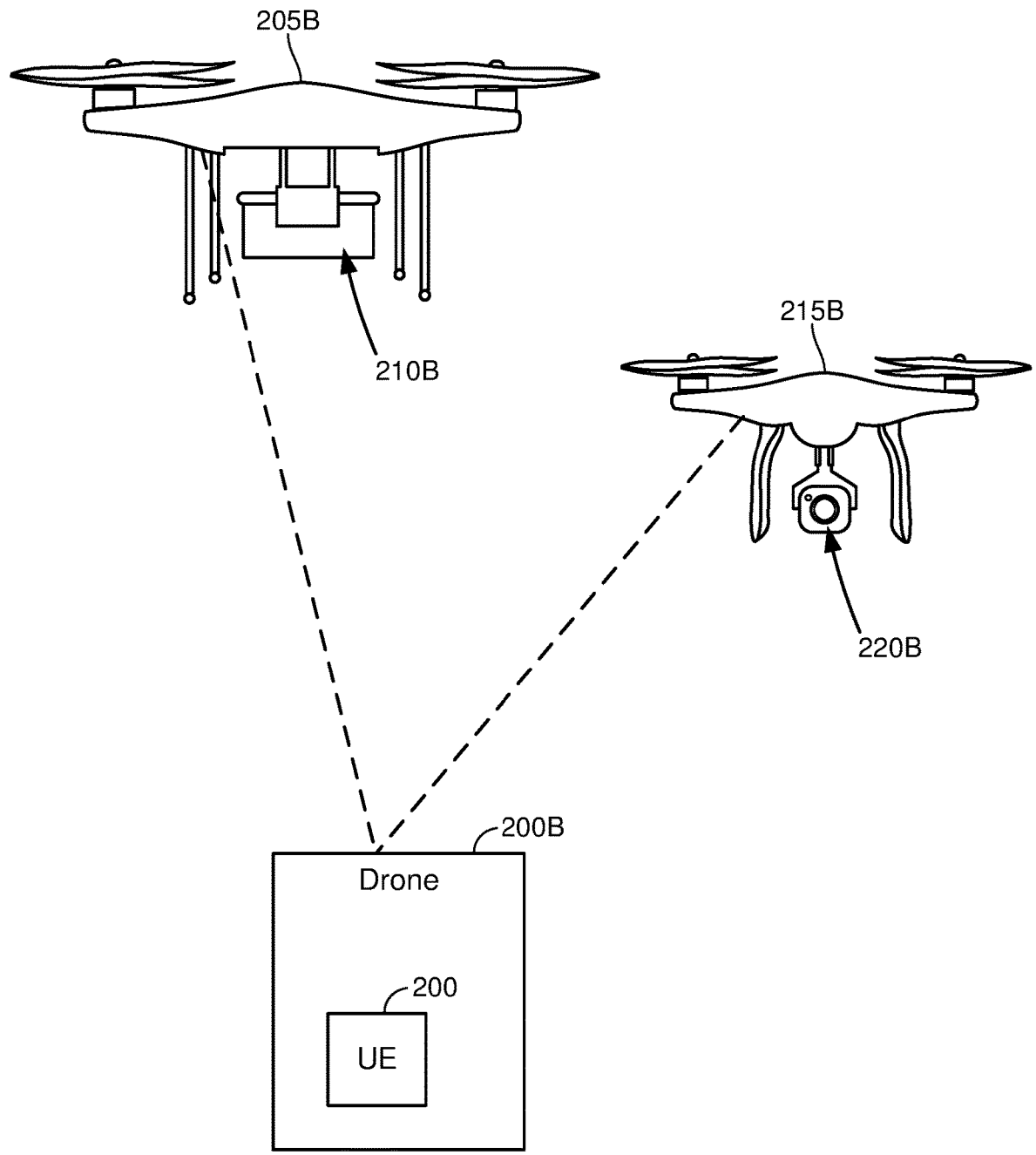
FIG. 2B illustrates the UE of FIG. 2A deployed within a drone in accordance with an embodiment of the disclosure.

FIG. 2B illustrates a drone 200B in accordance with an embodiment of the disclosure. The drone 200B, which may be a commercial drone that is licensed for at least some level of in-flight access to one or more terrestrial wireless communication subscriber networks, includes various flying hardware and flying control components (not shown), and is coupled to the UE 200. The UE 200 in FIG. 2B may thereby alternatively be referred to as a drone-coupled UE. In one example, the UE 200 functions as a wireless communications component of the drone 200B through which the drone 200B can establish a connection with the one or more terrestrial wireless communication subscriber networks for which in-flight access is authorized. In a further example, the UE 200 in the drone 200B can be integrated with the flying control components of the drone 200B in at least one embodiment (e.g., the processor(s) 205 and/or memory 210 may support both the communications functionality of the UE 200 as well as flying control).

Alternatively, the UE 200 may be coupled to the drone 200B physically but not communicatively. For example, a user may simply duct-tape the UE 200 to the drone 200B so that the UE 200 may record and stream video while the drone 200B is flown and controlled completely independently from the UE 200. Hence, depending on how the UE 200 and drone 200B are configured, the UE 200 may be a drone-coupled UE in a physical sense, a communicative sense, or both. Further, a physical coupling between the UE 200 and the drone 200B may be semi-permanent (e.g., the UE 200 is an integrated physical component installed into the drone 200B, such as the terrestrial wireless communication subscriber network module 290), or temporary (e.g., a user ties or tapes the UE 200 onto the drone 200B).

Moreover, as will be described below in more detail, the UE 200 may be configured to access the one or more terrestrial wireless communication subscriber networks while the drone 200B is in-flight, or alternatively when the drone 200B is not in-flight (i.e., grounded). In FIG. 2B, two example implementations of the drone 200B are shown. In particular, a package-delivery drone 205B is shown carrying a package 210B, and a surveillance drone 215B is shown with an attached camera 220B.

Figure 3:
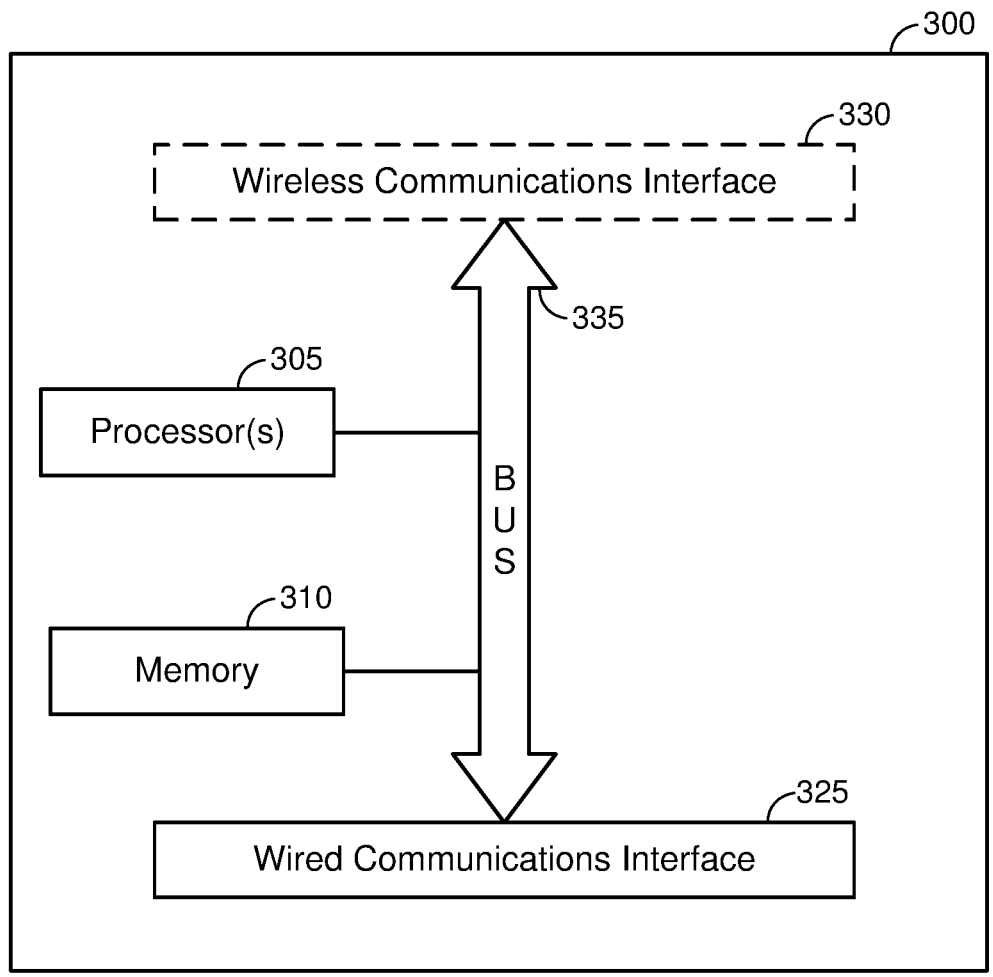
FIG. 3 illustrates a network component in accordance with an embodiment of the disclosure.

FIG. 3 illustrates a network component 300 of a terrestrial wireless communication subscriber network in accordance with an embodiment of the disclosure. The network component 300 may be a component of the RAN 120 (e.g., a base station, Node B, eNB, gNB, etc.), or alternatively may be a core network component of the terrestrial wireless communication subscriber network (e.g., a Mobility Management Entity (MME) of an LTE core network, etc.). The network component 300 includes one or more processors 305 (e.g., one or more ASICs, one or more DSPs, etc.) and a memory 310 (e.g., RAM, ROM, EEPROM, flash cards, or any memory common to computer platforms). The network component 300 further includes a wired communications interface 325 and (optionally) a wireless communications interface 330. In an example, the wireless communications interface 330 may be optional if the network component 300 is implemented as a core network component, which is essentially a network server. The various components 305-330 of the network component 300 can communicate with each other via a bus 335. In an example embodiment, the wired communications interface 325 can be used to connect to one or more backhaul components.

In another example embodiment, the wireless communications interface 330 (if made part of the network component 300) includes one or more wireless transceivers for communication in accordance with a wireless communications protocol. The wireless communications protocol may be based on the configuration of the network component 300. For example, if the network component 300 corresponds to an access point that is implemented as a macro cell or a small cell (e.g., a femto cell, a pico cell, etc.), the wireless communications interface 330 may include one or more wireless transceivers configured to implement a cellular protocol (e.g., CDMA, W-CDMA, GSM, 3G, 4G, 5G LTE, 5G NR, etc.). In another example, if the network component 300 is implemented as a WiFi AP (e.g., part of a WLAN, an Internet of Things (IoT) network, etc.), the wireless communications interface 330 may include one or more wireless transceivers configured to implement a WiFi (or 802.11) protocol (e.g., 802.11a, 802.11b, 802.11g, 802.11n, 802.11ax, etc.).

Figure 4:
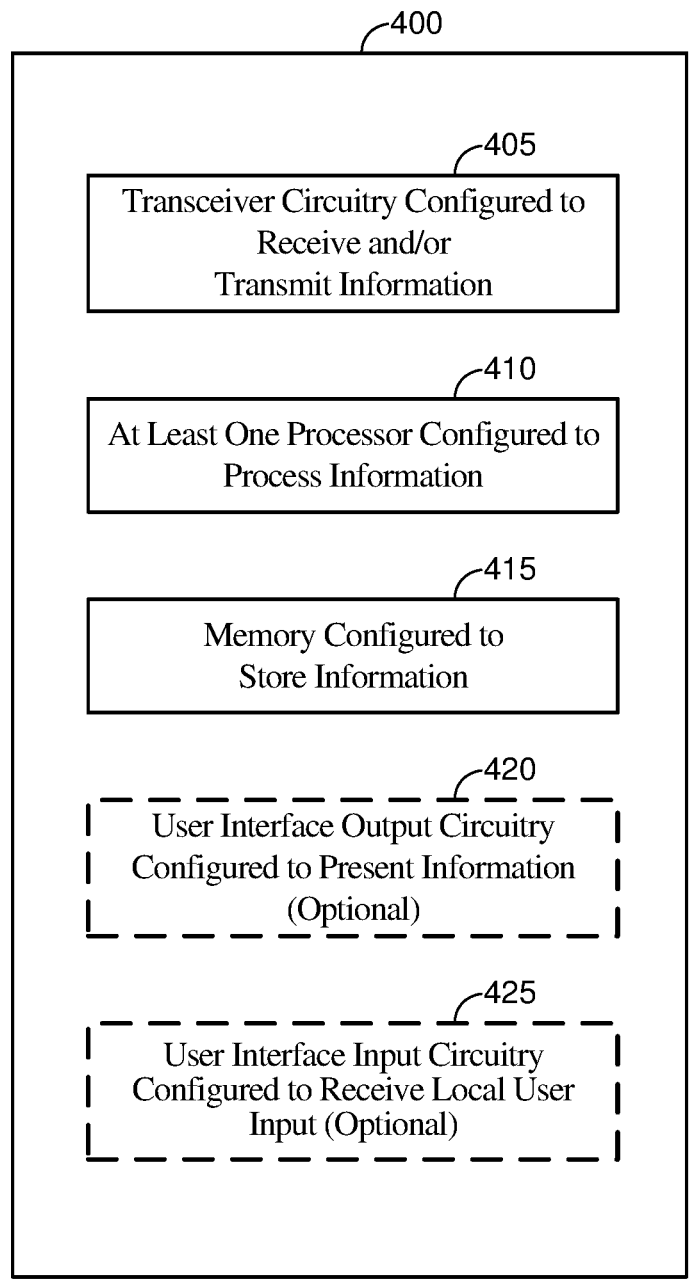
FIG. 4 illustrates a communications device that includes structural components in accordance with an embodiment of the disclosure.

FIG. 4 illustrates a communications device 400 that includes structural components in accordance with an embodiment of the disclosure. The communications device 400 can correspond to any of the above-noted communications devices, including but not limited to UE 200 or network component 300, any component included in the RAN 120 such as base stations, access points, eNBs, gNBs, BSCs or RNCs, any component of the core network 140, any component coupled to the Internet 175 (e.g., the server 170), and so on. Thus, communications device 400 can correspond to any electronic device that is configured to communicate with (or facilitate communication with) one or more other entities over the wireless communications system 100 of FIG. 1.

Referring to FIG. 4, the communications device 400 includes transceiver circuitry configured to receive and/or transmit information 405. In an example, if the communications device 400 corresponds to a wireless communications device (e.g., UE 200), the transceiver circuitry configured to receive and/or transmit information 405 can include a wireless communications interface (e.g., LTE, 5G NR, Bluetooth, WiFi, WiFi Direct, LTE-Direct, etc.) such as a wireless transceiver and associated hardware (e.g., an RF antenna, a MODEM, a modulator and/or demodulator, etc.). In another example, the transceiver circuitry configured to receive and/or transmit information 405 can correspond to a wired communications interface (e.g., a serial connection, a USB or Firewire connection, an Ethernet connection through which the Internet 175 can be accessed, etc.). Thus, if the communications device 400 corresponds to some type of network-based server (e.g., the server 170), the transceiver circuitry configured to receive and/or transmit information 405 can correspond to an Ethernet card, in an example, that connects the network-based server to other communication entities via an Ethernet protocol. In a further example, the transceiver circuitry configured to receive and/or transmit information 405 can include sensory or measurement hardware by which the communications device 400 can monitor its local environment (e.g., an accelerometer, a temperature sensor, a light sensor, an antenna for monitoring local RF signals, etc.). The transceiver circuitry configured to receive and/or transmit information 405 can also include software that, when executed, permits the associated hardware of the transceiver circuitry configured to receive and/or transmit information 405 to perform its reception and/or transmission function(s). However, the transceiver circuitry configured to receive and/or transmit information 405 does not correspond to software alone, and the transceiver circuitry configured to receive and/or transmit information 405 relies at least in part upon structural hardware to achieve its functionality. Moreover, the transceiver circuitry configured to receive and/or transmit information 405 may be implicated by language other than "receive" and "transmit", so long as the underlying function corresponds to a receive or transmit function. For example, functions such as obtaining, acquiring, retrieving, measuring, etc., may be performed by the transceiver circuitry configured to receive and/or transmit information 405 in certain contexts as being specific types of receive functions. In another example, functions such as sending, delivering, conveying, forwarding, etc., may be performed by the transceiver circuitry configured to receive and/or transmit information 405 in certain contexts as being specific types of transmit functions. Other functions that correspond to other types of receive and/or transmit functions may also be performed by the transceiver circuitry configured to receive and/or transmit information 405.

Referring to FIG. 4, the communications device 400 further includes at least one processor configured to process information 410. Example implementations of the type of processing that can be performed by the at least one processor configured to process information 410 includes but is not limited to performing determinations, establishing connections, making selections between different information options, performing evaluations related to data, interacting with sensors coupled to the communications device 400 to perform measurement operations, converting information from one format to another (e.g., between different protocols such as .wmv to .avi, etc.), and so on. For example, the at least one processor configured to process information 410 can include a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the at least one processor configured to process information 410 may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The at least one processor configured to process information 410 can also include software that, when executed, permits the associated hardware of the at least one processor configured to process information 410 to perform its processing function(s). However, the at least one processor configured to process information 410 does not correspond to software alone, and the at least one processor configured to process information 410 relies at least in part upon structural hardware to achieve its functionality. Moreover, the at least one processor configured to process information 410 may be implicated by language other than "processing", so long as the underlying function corresponds to a processing function. For example, functions such as evaluating, determining, calculating, identifying, etc., may be performed by the at least one processor configured to process information 410 in certain contexts as being specific types of processing functions. Other functions that correspond to other types of processing functions may also be performed by the at least one processor configured to process information 410.

Referring to FIG. 4, the communications device 400 further includes memory configured to store information 415. In an example, the memory configured to store information 415 can include at least a non-transitory memory and associated hardware (e.g., a memory controller, etc.). For example, the non-transitory memory included in the memory configured to store information 415 can correspond to RAM, flash memory, ROM, erasable programmable ROM (EPROM), EEPROM, registers, hard disk, a removable disk, a CD-ROM, or any other form of storage medium known in the art. The memory configured to store information 415 can also include software that, when executed, permits the associated hardware of the memory configured to store information 415 to perform its storage function(s). However, the memory configured to store information 415 does not correspond to software alone, and the memory configured to store information 415 relies at least in part upon structural hardware to achieve its functionality. Moreover, the memory configured to store information 415 may be implicated by language other than "storing", so long as the underlying function corresponds to a storing function. For example, functions such as caching, maintaining, etc., may be performed by the memory configured to store information 415 in certain contexts as being specific types of storing functions. Other functions that correspond to other types of storing functions may also be performed by the memory configured to store information 415.

Referring to FIG. 4, the communications device 400 further optionally includes user interface output circuitry configured to present information 420. In an example, the user interface output circuitry configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communications device 400. For example, if the communications device 400 corresponds to the laptop 240 or touchscreen device 255 as shown in FIG. 2A, the user interface output circuitry configured to present information 420 can include a display such as display screen 245 or touchscreen display 260. In a further example, the user interface output circuitry configured to present information 420 can be omitted for certain communications devices, such as certain UEs (e.g., terrestrial wireless communication subscriber network module 290) and/or network communications devices that do not have a local user (e.g., network switches or routers, remote servers, etc.). The user interface output circuitry configured to present information 420 can also include software that, when executed, permits the associated hardware of the user interface output circuitry configured to present information 420 to perform its presentation function(s). However, the user interface output circuitry configured to present information 420 does not correspond to software alone, and the user interface output circuitry configured to present information 420 relies at least in part upon structural hardware to achieve its functionality. Moreover, the user interface output circuitry configured to present information 420 may be implicated by language other than "presenting", so long as the underlying function corresponds to a presenting function. For example, functions such as displaying, outputting, prompting, conveying, etc., may be performed by the user interface output circuitry configured to present information 420 in certain contexts as being specific types of presenting functions. Other functions that correspond to other types of presenting functions may also be performed by the user interface output circuitry configured to present information 420.

Referring to FIG. 4, the communications device 400 further optionally includes user interface input circuitry configured to receive local user input 425. In an example, the user interface input circuitry configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communications device 400. For example, if the communications device 400 corresponds to laptop 240 or touchscreen device 255 as shown in FIG. 2A, the user interface input circuitry configured to receive local UI area 250 or touchscreen display 260, etc. In a further example, the user interface input circuitry configured to receive local user input 425 can be omitted for certain communications devices, such as certain UEs (e.g., terrestrial wireless communication subscriber network module 290) and/or network communications devices that do not have a local user (e.g., network switches or routers, remote servers, etc.). The user interface input circuitry configured to receive local user input 425 can also include software that, when executed, permits the associated hardware of the user interface input circuitry configured to receive local user input 425 to perform its input reception function(s). However, the user interface input circuitry configured to receive local user input 425 does not correspond to software alone, and the user interface input circuitry configured to receive local user input 425 relies at least in part upon structural hardware to achieve its functionality. Moreover, the user interface input circuitry configured to receive local user input 425 may be implicated by language other than "receiving local user input", so long as the underlying function corresponds to a receiving local user function. For example, functions such as obtaining, receiving, collecting, etc., may be performed by the user interface input circuitry configured to receive local user input 425 in certain contexts as being specific types of receiving local user functions. Other functions that correspond to other types of receiving local user input functions may also be performed by the user interface input circuitry configured to receive local user input 425.

Referring to FIG. 4, while the configured structural components of 405 through 425 are shown as separate or distinct blocks in FIG. 4 that are implicitly coupled to each other via an associated communication bus (not shown expressly), it will be appreciated that the hardware and/or software by which the respective configured structural components of 405 through 425 performs their respective functionality can overlap in part. For example, any software used to facilitate the functionality of the configured structural components of 405 through 425 can be stored in the non-transitory memory associated with the memory configured to store information 415, such that the configured structural components of 405 through 425 each performs their respective functionality (i.e., in this case, software execution) based in part upon the operation of software stored by the memory configured to store information 415. Likewise, hardware that is directly associated with one of the configured structural components of 405 through 425 can be borrowed or used by other of the configured structural components of 405 through 425 from time to time. For example, the at least one processor configured to process information 410 can format data into an appropriate format before being transmitted by the transceiver circuitry configured to receive and/or transmit information 405, such that the transceiver circuitry configured to receive and/or transmit information 405 performs its functionality (i.e., in this case, transmission of data) based in part upon the operation of structural hardware associated with the at least one processor configured to process information 410.

UEs such as phones, tablet computers, desktop computers or laptop computers, are generally configured to connect to terrestrial wireless communication subscriber networks (e.g., 3G, 4G, 5G, etc.) with the expectation that the UEs are not airborne. For example, users are typically asked to place their respective UEs into "airplane" mode between takeoff and landing for commercial flights, which restricts the UEs' capability for connecting to terrestrial wireless communication subscriber networks.

For most manned (or piloted) aerial vehicles, typical cruising altitudes and/or speeds make connections to terrestrial wireless communication subscriber networks impractical. For example, commercial aircraft may reach cruising altitudes near 12 km at speeds between 800-1000 km/hr. Instead of relying upon terrestrial wireless communication subscriber networks to support communications for/with manned aerial vehicles such as commercial aircraft, most countries allocate a portion of Very High Frequency (VHF) radio spectrum to define an Airband or Aircraft band that is dedicated to radio-navigational communications and/or air traffic control communications.

Regulatory agencies are increasingly authorizing deployment of unmanned aerial vehicles (UAVs), such as commercial drones. Commercial drones are being considered to provide a variety of services, such as package delivery, search-and-rescue, monitoring of critical infrastructure, wildlife conservation, flying cameras, surveillance, and so on. Commercial drones may operate at altitudes and speeds that are more suitable for connections to terrestrial wireless communication subscriber networks. For example, in certain environments, commercial drones may operate at cruising altitudes near 100 m at speeds up to or near 160 km/h.

Unmanned aircraft system traffic management (UTM) is a traffic management system for uncontrolled operations that is separate from, but complementary to, the Federal Aviation Administration's (FAA) air traffic management (ATM) system. UTM manages the airspace to enable multiple drone operations conducted beyond visual line-of-sight (BVLOS), where air traffic services are not provided. Responsibility of an UTM may include authentication, authorization and traffic management of UAVs. It may be desirable to provide pertinent state information of UAVs to an UTM to efficiently track, allocate flight paths, and manage traffic of UAVs.

Example Updating UAV Status in UAS Ecosystem

An unmanned aircraft system (UAS) ecosystem may provide information whether an UAV is present at the source or destination of the allocated flight path to an UTM. However, an UAS ecosystem may not be equipped with providing UAV state information other than whether the UAV is at the source or destination of the flight path.

It may be desirable to provide additional state information of the UAV to an UTM to improve efficiency of an UAS ecosystem. In particular, providing whether an UAV is in flight mode and/or standby mode to an UTM may allow the UTM to judiciously assign/re-assign flight paths of the UAV and other UAVs, perform enhanced power management by communicating to the UAV to shut down non-essential functions or unused sensors, and reduce latency of the UTM by more efficiently managing operation of UAVs.

Figure 5:
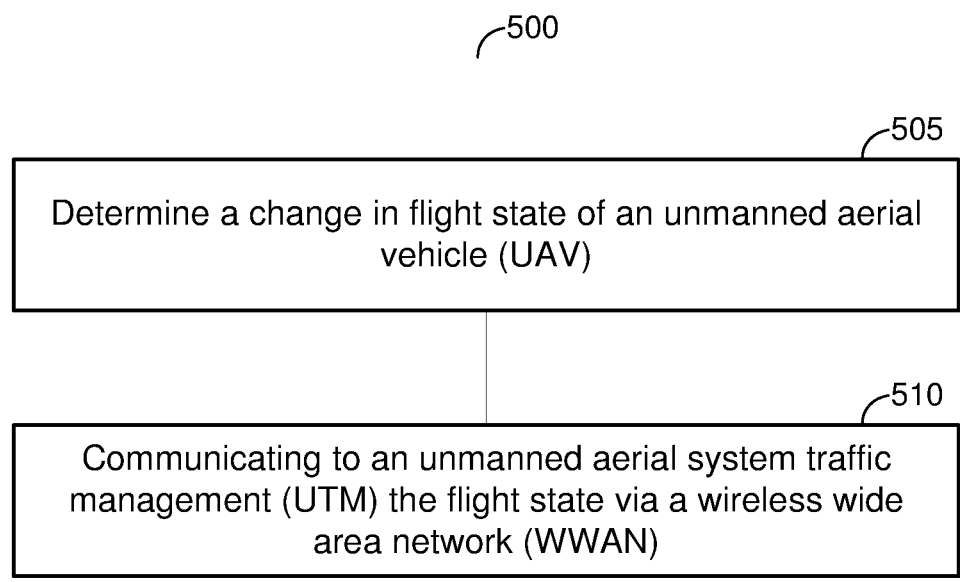
FIG. 5 illustrates an example operation 500 for updating UAV status to an UTM in UAS ecosystem.

FIG. 5 illustrates an example operation 500 for updating UAV status to an UTM in UAS ecosystem. In certain aspects, operation 500 illustrated in FIG. 5 may be done by a UE 200 in FIG. 2B. In certain aspects, the UAV may be a drone 200B in FIG. 2B. According to the operation 500 in FIG. 5, in step 505, a UE may determine a change in flight state of an UAV. In certain aspects, the flight state of an UAV may indicate whether the UAV is in flight and/or moving, i.e., in flight and moving, in flight but not moving, not in flight but moving, not in flight and not moving. For example, flight state of an UAV may be indicated by a 2 bit field where 00 may indicate that the UAV is in mobile mode (moving on ground without taking flight), 01 may indicate that the UAV is in stationary mode, 10 may indicate that the UAV is in flight mode (taken flight path), and 11 may be reserved. For example, the 2 bit field may be a 2 bit IE in an UE capability message wherein the serving base station upon receiving the UE capability message may indicate to the UTM through an UAS ecosystem the flight state of the UAV.

In an aspect, the determination of whether the UAV is in flight state may be determined in a variety of ways. For example, the drone-coupled UE may be communicatively coupled to a drone, which notifies the drone-coupled UE as to whether the drone is currently engaged in the flying state (or flying mode), e.g., based on the status of one or more of its mechanical or electrical components. In another example, various measurements (e.g., speed, altitude, etc.) made independently by the drone-coupled UE itself may be sufficient for the drone-coupled UE to determine and/or differentiate between its in-flight or grounded status. In one example, such determination may be based on a reference altitude/height threshold, i.e., if the current altitude/height of the drone-coupled UE meets the threshold requirement, then the UE is considered to be in a flying state. In one example, the determination may be based on the speed of the drone-coupled UE. In another example, the determination may be based on the direction in addition to the speed (i.e., velocity). In another example, the determination may be based on the combination of the above. In one example, such threshold(s) (e.g., reference height, threshold height, speed, velocity etc.) may be provided by the network to the UE.

According to the operation 500 in FIG. 5, in step 510, the UE may communicate to an UTM the flight state via a wireless wide area network (WWAN). In certain aspects, the UE may communicate to an UTM whether the UAV is in flight and/or moving, i.e., in flight and moving, in flight but not moving, not in flight but moving, not in flight and not moving. For example, the UE may communicate to the UTM the flight state of the UAV using a 2 bit field where 00 may indicate that the UAV is in mobile mode (moving on ground without taking flight), 01 may indicate that the UAV is in stationary mode, 10 may indicate that the UAV is in flight mode (taken flight path), and 11 may be reserved. In certain aspects, the flight state information of the UAV may be communicated by the UE to the UTM using the operations described in FIG. 6 or FIG. 7.

Various operations 500 of FIG. 5 may be performed by a UE 200 in FIG. 2A and FIG. 2B. In particular, block 505 may be performed by a processor 205, and/or a UE input component 215. Block 510 may be performed by a wireless communication interface 230 and/or a processor 205.

Figure 6:
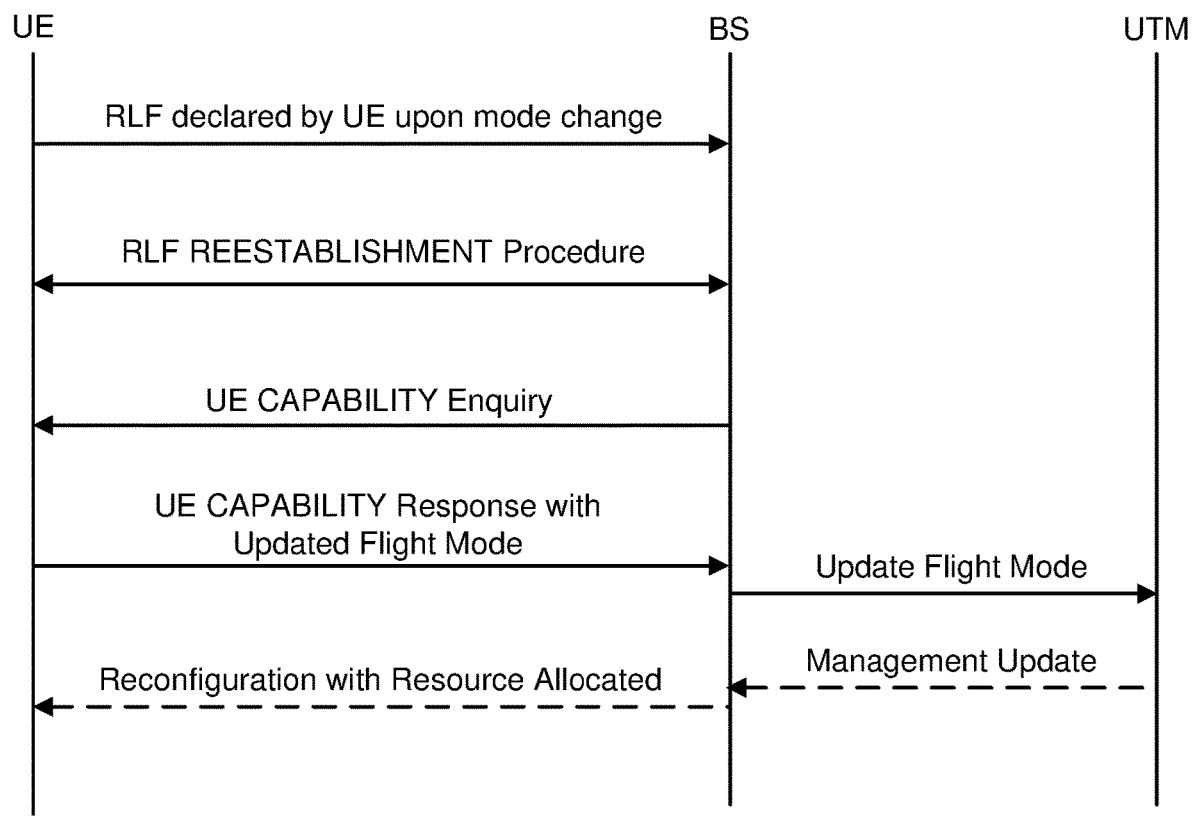
FIG. 6 illustrates an example operation for communicating the flight state of an UAV to an UTM using radio link failure (RLF) recovery procedure.

FIG. 6 illustrates an example operation for communicating the flight state of an UAV to an UTM using radio link failure (RLF) recovery procedure. In certain aspects, the UE in step 510 in FIG. 5 may communicate to the UTM the flight state of the UAV using the operation illustrated in FIG. 6. Upon determination of flight state change of the UAV, the UE may declare RLF and inform RLF to a base station (BS). The BS may initiate an RLF re-establishment procedure. The BS may then send a UE capability enquiry message to the UE. Upon receiving the UE capability enquiry, the UE may send a UE capability response with update flight mode. In an example, the UE capability response may include a 2 bit IE where 00 may indicate that the UAV is in mobile mode (moving on ground without taking flight), 01 may indicate that the UAV is in stationary mode, 10 may indicate that the UAV is in flight mode (taken flight path), and 11 may be reserved. Based on the received UE capability, the BS may indicate the updated flight mode of the UAV to the UTM. Optionally, the UTM may determine to assign or re-assign resource to the UAV or other UAVs and may send a management update message to the BS to allocate resources. The BS may then send an RRC reconfiguration message with the resource allocated to the UE.

Figure 7:
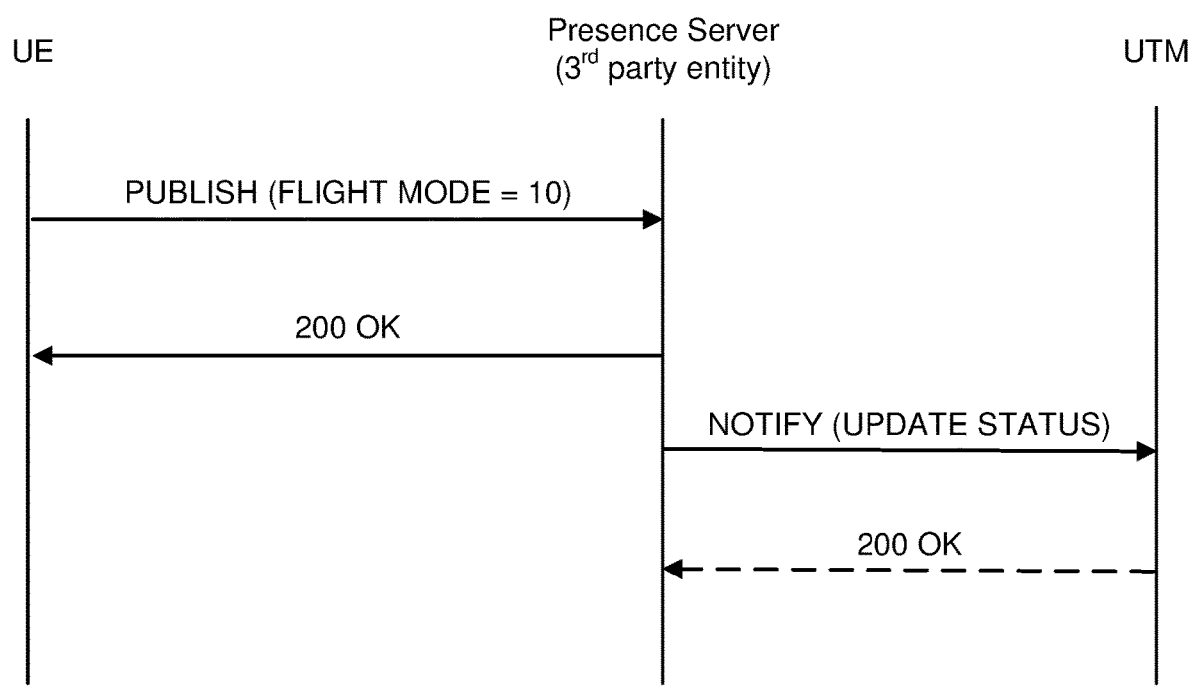
FIG. 7 illustrates an example operation for communicating the flight state of an UAV to an UTM using session initiation protocol (SIP) procedure.

FIG. 7 illustrates an example operation for communicating the flight state of an UAV to an UTM using session initiation protocol (SIP) procedure. In certain aspects, the UE in step 510 in FIG. 5 may communicate to the UTM the flight state of the UAV using the operation illustrated in FIG. 6. Based on determining flight state change of the UAV, the UE may send a SIP PUBLISH message to a presence server which the UAV and UTM are subscribed to. Upon receiving the SIP PUBLISH message, the presences server may send a NOTIFY message to the UTM indicating change in the flight state of the UAV. UTM may then approve the status change of the UAV and allocate resources via RRC reconfiguration procedure between BS and UE.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a processor 205, a wired communication interface 225, and/or wireless communication interface 230 of the user equipment 200. Additionally, means for obtaining, means for designating, means for aggregating, means for collecting, means for selecting, means for switching, and means for detecting may comprise one or more processors, such as the processor 205 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication performed by a user equipment (UE), comprising:
    determining a change in flight state of an unmanned aerial vehicle (UAV);
    initiating a radio link failure (RLF) procedure;
    communicating to an unmanned aerial system traffic management (UTM) the fight state via a wireless wide area network (WWAN); and
    further comprising communicating to the UTM a capability information of the UAV, wherein the capability information comprises the flight state, and wherein the capability information is based on the determined change in the flight state.

2. The method of claim 1, wherein the flight state comprises a mobile mode, a stationary mode, or a flight mode.

3. The method of claim 1, wherein the communicating to an UTM the flight state comprises communicating to a presence server the determined change in the flight state.

4. A method of communication performed by an unmanned aerial system traffic management (UTM), comprising:
    receiving an information indicative of a change in a flight state of an unmanned aerial vehicle (UAV);
    managing operation of one or more UAVs based on the information, wherein managing comprises at least one of allocating flight path, allocating resource, and managing traffic.

5. A user equipment (UE) for wireless communication, comprising:
    a memory; and
    at least one processor coupled to the memory and configured to:
        determine a change in flight state an unmanned aerial vehicle (UAV);
        initiate a radio link failure (RLF) procedure;
        communicate to an unmanned aerial system traffic management (UTM) the fight state via a wireless wide area network (WWAN); and
        the at least one processor is further configured to communicate to the UTM a capability information of the UAV, wherein the capability information comprises the flight state, and wherein the capability information is based on the determined change in the flight state.

6. The UE of claim 5, wherein the flight state comprises a mobile mode, a stationary mode, or a flight mode.

7. The UE of claim 5, wherein the communicate to an UTM the flight state comprises communicate to a presence server the determined change in the flight state.

8. An unmanned aerial system traffic management (UTM) for communication, comprising:
    a memory; and
    at least one processor coupled to the memory and configured to:
    receive an information indicative of a change in a flight state of an unmanned aerial vehicle (UAV), wherein the receive comprises receiving a capability information of the UAV;
    manage operation of one or more UAVs based on the information, wherein managing comprises at least one of allocating flight path, allocating resource, and managing traffic.

9. An apparatus for wireless communication by a user equipment (UE), comprising:
    means for determining a change in flight state of an unmanned aerial vehicle (UAV);
    means for initiating a radio link failure (RLF) procedure;
    means for communicating to an unmanned aerial system traffic management (UTM) the fight state via a wireless wide area network (WWAN); and
    further comprising means for communicating to the UTM a capability information of the UAV, wherein the capability information comprises the flight state, and wherein the capability information is based on the determined change in the flight state.

10. The apparatus of claim 9, wherein the flight state comprises a mobile mode, a stationary mode, or a flight mode.

11. The apparatus of claim 9, wherein the communicating to an UTM the flight state comprises communicating to a presence server the determined change in the flight state.

12. A apparatus of communication performed by an unmanned aerial system traffic management (UTM), comprising:
    means for receiving an information indicative of a change in a flight state of an unmanned aerial vehicle (UAV), wherein the means for receiving comprises means for receiving a capability information of the UAV;
    means for managing operation of one or more UAVs based on the information, wherein managing comprises at least one of allocating flight path, allocating resource, and managing traffic.

* * * * *